United States Patent Office 2,727,837
Patented Dec. 20, 1955

2,727,837

PROCESS FOR IMPROVED BONDING STRENGTH IN COATED PAPERS

George P. Gregory, Willow Run, Del., assignor to Hercules Powder Company, Wilmington, Del., a corporation of Delaware No Drawing. Application July 25, 1952,
Serial No. 300,971

18 Claims. (Cl. 117—157)

This invention relates to an improvement in coating paper with a coating composition or color to obtain a coated paper of the type having a base of cellulosic fibers and a printing surface consisting essentially of a film of contiguous pigment particles interspersed in binder by means of which the pigment is retained on the base.

The paper coating colors as employed in the paper industry today consist essentially of a water solution of a binder such as starch or casein to which is added fillers. The adhesive filler mixture is applied to paper in metered amounts and dried. The ratio of pigment to adhesive is regulated to provide sufficient bond between the coating and the paper base to prevent picking during the printing operation. The incorporation of the adhesive in the portions necessary to prevent picking results in certain disadvantages. For one thing, the optical properties of the coated sheet are adversely affected. Other disadvantages relate to factors affecting the lay of the ink and the ink drying rate, both of which properties are adversely affected by the high ratio of binder to pigment.

For some time it has been apparent that an adhesive which could be used in lesser amounts than casein or starch and still provide adequate strength against picking might conceivably result in improved optical properties and improved printability characteristics. Such a result has in fact been provided to a certain extent by the process of U. S. 2,502,783 to D. R. Erickson. This process comprises coating paper with a continuous viscous coating consisting of pigment dispersed in a solution of hydroxy-ethyl cellulose and aqueous sodium hydroxide, and immediately after application of the coating, precipitating the hydroxyethyl cellulose which then acts as an adhesive to bind the contiguous pigment particles to each other and to the base and finally drying the coated paper.

The process, while accomplishing the desired result of providing a relatively high pigment to binder ratio, has certain inherent disadvantages. The strong caustic soda solution used in the coating composition must subsequently be neutralized and the hydroxyethyl cellulose precipitated or gelled. Furthermore, the neutralized paper must be pressed or squeezed to remove as much electrolyte as possible. The overall result is a paper coating process which involves two entirely new operations, the apparatus for which is not available on existing paper coating machinery. These two new operations are the coagulation and neutralization step on the one hand and the pressing or squeezing step on the other. These two new operations complicate the utilization of hydroxyethyl cellulose as a paper coating adhesive from a processing standpoint. They constitute a substantial deterrent to the adoption by the paper coating industry of the hydroxyethyl cellulose coatings.

There is an important point for consideration in this connection. The Erickson patent does not disclose the necessity of pressing or squeezing the excess setting agent (including neutralization products) from the paper after the hydroxyethyl cellulose has been precipitated or coagulated. In any practical adaptation of the process, however, such a pressing or squeezing step is absolutely essential. In the first place, in order to effectively carry out the process commercially, an excess of setting agent must be employed to flood the sheet. There must then be employed a pressing or squeezing operation to remove the excess electrolyte from the sheet. Otherwise, there will be present in the resulting dried coatings an excess of electrolyte with attendant impairment of the optical and printing properties of the sheets. Since the films involved are very thin, a small residual amount of setting agent can markedly adversely affect the properties of the coated paper.

Moreover, the relatively high alkali content of the coating colors of Erickson introduces several disadvantages. These are (1) the variation in the surface pH of the coating due to a lack of uniformity in the neutralization of the alkali, thereby causing uneven printing properties; (2) degradation of the surface fibers of the base stock by the alkali with a resulting loss in brightness; and (3) the difficulty of handling and of disposing of waste color.

I have now discovered a process for preparing a coated paper adapted for printing which overcomes the disadvantages of the prior art process and which is most suitable for commercial employment. This process comprises coating a paper with a coating composition consisting essentially of a coating pigment dispersed in an aqueous solution of a gellable, water-soluble cellulose derivative as the binder and a setting agent therefor. The concentration of the setting agent in the coating composition prior to application to the paper is insufficient to induce coagulation of the cellulose derivative. Hence, there is no coagulation of the cellulose derivative immediately upon application of the coating composition to the paper. The coated paper is then dried. Upon loss of moisture during drying, the setting agent is concentrated to a point at which it induces coagulation of the gellable, water-soluble cellulose derivative, thereby improving the bonding strength of the adhesive. There results a coated paper of the type having a base of cellulosic fibers and a printing surface consisting essentially of a film of contiguous pigment particles interspersed in binder by means of which the pigment is retained on the base. Thus, the objectionable dipping and squeezing operations of the prior art are entirely eliminated and the process reduced to the conventional two-step operation of the prior art, i. e., coating and drying. Moreover, by the use of water-soluble cellulose derivatives, the disadvantages introduced by the relatively high alkali content of the coating colors of Erickson are also avoided. There results a paper marked by more uniform surface pH of the coating with negligible degradation of the fibers of the base stock. Furthermore, waste color is easily handled and disposed of.

Any gellable water-soluble cellulose derivative may be used as the binder in preparing the coated papers according to the process of the instant invention. By "water-soluble" is meant that the cellulose derivative at a 5% by weight concentration is colloidally dispersed in water. A small amount of alkali may be added if higher concentrations of binder or lower viscosities in the resulting coating color are desired. When it is desired to use alkali, it is often advantageous in preparing the color to add the cellulose derivative to an aqueous alkali solution, disperse the pigment in the solution of the cellulose derivative in aqueous alkali, and then add water to obtain the desired amount of solids. In any case, the amount of alkali should not exceed about 1% by weight based on the total weight of the coating color.

Cellulose itself is not water-soluble despite the large number of hydroxyl groups contained in the molecule.

This is due to the fact that the cellulose chains fit so well against one another that complete linking of adjoining chains by hydrogen bonding occurs. Moreover, the cellulose molecule is rigid enough to prevent a relatively short segment from lifting off without disturbing the neighboring portion of the chain. Water does not form a stable enough complex with the hydroxyl groups to destroy the hydrogen bonding. The insertion of substituent groups into the cellulose chain pushes apart the cellulose molecules rendering the hydroxyl radicals available for hydration. To get smooth solutions, enough substituent groups have to be introduced throughout the whole molecule to insure complete separation of the least substituted portions of the chains by water. If too many substituent groups are introduced, however, the number of hydroxyl groups available for hydration is greatly reduced, and unless the substituent group itself is capable of hydration the product is incompletely soluble or only swelled by water. If the substituent group enters the cellulose molecule in a uniform manner along the cellulose chain, it will be more effective in separating the cellulose molecules than if it were to be randomly distributed along the chain. Thus, water solubility can be obtained at lower degrees of substitution when a fairly uniform distribution of substituent radicals is obtained. The manner of substitution, i. e., the degree of randomness, is determined by the method of manufacturing the substituted cellulose. Thus, the water solubility of cellulose is determined by the nature of the substituent group, the method of manufacture, and the degree of substitution, i. e., the number of substituent groups per anhydroglucose unit. Examples of water-soluble cellulose derivatives are the alkyl ethers, such as ethyl cellulose; hydroxyalkyl ethers, such as hydroxyethyl cellulose; sulfoalkyl ethers, such as sulfoethyl cellulose; carboxyalkyl ethers, such as carboxymethylcellulose; cellulose sulfate and celluose half-esters of dibasic acids, such as cellulose phthalate, cellulose succinate, etc.

Those cellulose derivatives which may have free acid groups, such as cellulose sulfate, sulfoalkyl cellulose and cellulose half-esters of dibasic organic acids, are used in the form of their water-soluble salts such as their sodium, potassium, ammonium, etc., salts. By the terms "cellulose sulfate," "sulfoalkyl cellulose," "carboxyalkyl cellulose," "carboxyalkyl hydroxyalkyl cellulose," "cellulose phthalate," "cellulose succinate," etc., as used throughout the specification and claims is meant the salts of the particular cellulose derivative which possess the requisite solubility characteristics specified above. Examples of operable ranges of substitution in terms of the available number of substituent groups per anhydroglucose unit for particular cellulose derivatives are hydroxyethyl cellulose, about 0.8 to about 1.7; sodium carboxymethylcellulose, about 0.5 to about 1.0; sodium sulfoethyl cellulose, about 0.3 to about 0.6; sodium cellulose sulfate, about 0.2 to about 1.5; and sodium carboxymethyl hydroxyethyl cellulose, about 0.3 to about 0.6 carboxymethyl groups and about 0.4 to about 0.6 hydroxyethyl groups with a total degree of substitution of from about 0.7 to about 1.2. It is understood that the limits of substitution for any particular cellulose derivative will vary somewhat with the method of manufacture of the cellulose derivative, the nature of the setting agent employed and the concentration of setting agent used. The variation of these factors to obtain gellable water-soluble cellulose derivatives is within the knowledge of those skilled in the art, and it is to be understood that the binder contemplated herein includes any or all of these derivatives.

In carrying out the invention a suitable paper base is selected. This base may be of the type used in making book paper. However, it may be any of the other types of paper to which coatings are applied in accordance with the practice of the art. Thus, for example, paperboard, etc., may be used for the base. The term "paper" as used herein is intended to include all such bases.

The application of the coating is carried out in accordance with standard practices in the paper coating art. The machine employed may be a brush coater, a roll coater, a meniscus coater, an air brush coater, a gravure or letter press-type coater or any other suitable coating machine known to those skilled in the art.

The final step in the process is the drying of coated paper. Any of the various procedures known to the art for drying paper may be employed such as air drying, drum drying, festoon drying, tunnel drying or Yankee drying. If desired, the coated paper may be dried in intimate contact with a smooth roll, such as one with a high chrome polish, to impart to the surface of the coating a smoothness comparable to that of the roll.

The pigment material which is utilized in the coating color comprises one of the paper coating fillers, such as, for example, a pulverized clay or the like. For higher quality or special types of paper there may be substituted therefor other known pigment materials, such as, for example, titanium dioxide, satin white or other coating pigments, alone or preferably with a clay base. The modification of the coating color using these materials will be within the knowledge of those skilled in the art, and it is to be understood that the pigment material contemplated herein includes any or all of these materials.

The amount of binder in the coating color is maintained between 3% and about 15% based on the weight of the pigment and preferably between about 6% and about 8%. In particular, the binder content will depend upon the grade and end use of the paper being prepared.

For optimum results in the coating of paper it is preferred to prepare a coating color having a total solids composition which is relatively high, thus providing good surface coating quality and economic operation. A preferred range of total solids for the coating color is between about 30% and 65% solids with an optimum value at about 40% to 55%.

Any setting agent for a gellable water-soluble cellulose derivative may be employed in accordance with this invention. Among the setting agents which may be used to coagulate the water-soluble cellulose derivatives are, for example, magnesium chloride, monosodium phosphate, calcium chloride, sodium chloride, etc. The efficacy of a particular setting agent varies somewhat with the nature of the cellulose derivative. Additional information relative to the mechanism of coagulation and the wide variety of compounds effective for this purpose are given hereinafter.

The concentration of the setting agent in the coating composition prior to application to the paper should not be so high as to induce coagulation of the cellulose derivative. Whether or not coagulation has been induced can be easily ascertained by a skilled chemist. The maximum concentration of setting agent which may be added to the coating color without inducing the coagulation of the cellulose derivative varies both with the nature of the setting agent and the nature and concentration of the cellulose derivative. Similarly, the minimum concentration of setting agent which will induce coagulation of the adhesive and thereby improve the resulting strength of the adhesive upon drying varies with both the nature of the setting agent and the nature and concentration of the cellulose derivative. As the concentration of the setting agent in the color is increased from an initial low value, the coagulation upon drying the color becomes more complete, and the bonding strength progressively increases. Finally, when enough setting agent is present to produce maximum coagulation of the cellulose derivative, the presence of additional electrolyte in the color will effect a negligible increase in bonding strength. Therefore, the minimum amount of setting agent which may be used in a particular formulation is that amount which is necessary to produce the degree of coagulation of the cellulose derivative which results in a significant increase in bonding strength over that bonding strength which would be obtained if no setting agent were used. In general, the concentration of setting agent used will be between about 5% and about 12% by weight, based on the weight of the total color. However, concentrations of setting agent as low as 1%, by weight, have produced a definite improvement in the pick resistance of the resulting coating while the upper limit on the concentration of setting agent is set only at that concentration of setting agent which will not induce coagulation of the cellulose derivative prior to the application of the color to the paper.

The process of this invention provides several outstanding advantages as compared with the prior art process of Erickson. In the first place, it completely avoids the coagulation and neutralization step and the pressing or squeezing step in the coating operation. This is a most important feature because the coating machines and apparatus presently employed commercially are not constructed in such a way that these additional operations can be carried out satisfactorily thereby. Extensive changes in and additions to existing coating machines would have to be made to adapt them to a process involving these two additional operations.

A second advantage of the process of the invention lies in the production of coated papers having a lower electrolyte content in the coating. This results from the fact that when the setting agent is incorporated in the coating color only the amount required for coagulation need be employed and excess agent may be avoided. By virtue of the low electrolyte content of the coatings the resulting coated papers have excellent printing and optical properties. With respect to optical properties, in particular, the coated papers prepared in accordance with this invention are, in general, more opaque and brighter than the papers produced by the prior art.

Other important advantages of the present process result from the fact that the process of the instant invention makes use of water-soluble cellulose derivatives as adhesives. Thus, the coatings of the instant invention may be prepared without the use of any alkali in the coating color, thereby making possible a uniform surface pH of the coating, eliminating any possible degradation of the surface fibers of the base stock and resulting in a waste color easy to handle and dispose of. The coated papers prepared according to this invention have pick resistance values up to four times greater than those observed in coatings using regular water-soluble cellulose derivatives without the use of a setting agent.

The following examples are presented in illustration but not in limitation of the invention. All parts and percentages are by weight unless otherwise specified.

EXAMPLES 1–15

A series of experiments were carried out according to the following procedure.

To an aqueous solution of a water-soluble hydroxyethyl cellulose was added clay in small portions with vigorous agitation. After the clay was added, the stirring was continued until the color was smooth. An aqueous solution of setting agent was then added to the color in small portions with vigorous agitation. After the setting agent had been added, additional water was added to the color to give the desired amount of solids. This color was applied to handsheets of Litho No. 5 raw stock at a coat weight of 11–13 lb. per ream (24 x 36/500) using a Martinson laboratory coater. The sheets were then dried on an electric hot plate at 200° F.

A small amount of sodium hydroxide was added to the color in some of the examples to reduce the viscosity of the color. The per cent of sodium hydroxide in the colors, the number of hydroxyethyl groups per anhydroglucose unit, i. e., the degree of substitution of the adhesive, the nature of the setting agent, the per cent of adhesive, clay and setting agent in the coating color and the per cent solids of the color, together with the surface pH and pick resistance of the resulting paper are all set forth in the following table:

*Table I.—Hydroxyethyl cellulose (HEC)*

| Example No. | D. S. | Coating Color | | | | Surface pH | Pick Resistance (Speed Ranger Units) |
| --- | --- | --- | --- | --- | --- | --- | --- |
| | | Percent HEC (on clay) | Clay+ HEC (percent) | Setting Agent | Percent NaOH | | |
| 1 | 0.82 | 7.5 | 50 | none | 0.93 | 8.5–9.0 | 3.0 |
| 2 | 0.82 | 7.5 | 40 | 10% MgCl$_2$ | 1.0 | 5.5–6.0 | 4.5 |
| 3 | 0.82 | 7.5 | 40 | 10% CaCl$_2$ | 1.0 | 6.0 | 5.5 |
| 4 | 0.82 | 7.5 | 40 | 10% NaCl | 1.0 | 9.0 | 4.5 |
| 5 | 1.14 | 7.5 | 50 | none | 0.4 | 6.5–7.0 | 1.0 |
| 6 | 1.14 | 7.5 | 40 | 10% MgCl$_2$ | 0.32 | 5.5–6.0 | 2.5 |
| 7 | 1.14 | 7.5 | 40 | 10% CaCl$_2$ | 0.32 | 6.0 | 2.0 |
| 8 | 1.14 | 7.5 | 40 | 10% NaCl | 0.32 | 6.0–6.5 | 2.5 |
| 9 | 1.36 | 7.5 | 50 | none | 0 | 5.5–6.0 | 1.0 |
| 10 | 1.36 | 7.5 | 40 | 10% MgCl$_2$ | 0 | 5.5 | 2.5 |
| 11 | 1.36 | 7.5 | 40 | 10% CaCl$_2$ | 0 | 5.5–6.0 | 2.0 |
| 12 | 1.67 | 7.5 | 50 | none | 0 | 5.0–5.5 | 1.0 |
| 13 | 1.67 | 7.5 | 45 | 11% MgCl$_2$ | 0 | 5.5–6.0 | 4.0 |
| 14 | 1.67 | 7.5 | 45 | 11% CaCl$_2$ | 0 | 5.0–5.5 | 3.0 |
| 15 | 1.67 | 7.5 | 45 | 11% NaCl | 0 | 5.0–5.5 | 2.5 |

EXAMPLES 16–53

A coating color was prepared as in Examples 1–15, inclusive, using the sodium salt of a water-soluble carboxymethylcellulose in place of hydroxyethyl cellulose. This color was applied to handsheets of Litho No. 5 raw stock at a coat weight of 11–13 lb. per ream (24 x 36/500) using a Martinson laboratory coater. The sheets were then dried on an electric hot plate at 200° F.

A small amount of sodium hydroxide was added to the color in some of the examples to reduce the viscosity of the color. The per cent of sodium hydroxide in the colors, the number of carboxymethyl groups per anhydroglucose unit, i. e., the degree of substitution of the adhesive, the nature of the setting agent, the per cent of adhesive, clay and setting agent in the coating color and the per cent solids of the color, together with the surface pH and pick resistance of the resulting paper are all set forth in the following table:

A small amount of sodium hydroxide was added to the color in some of the examples to reduce the viscosity of the color. The per cent of sodium hydroxide in the

*Table II.—Sodium carboxymethylcellulose (CMC)*

| Example No. | D. S. | Coating Color | | | | Surface pH | Pick Resistance (Speed Ranger Units) |
|---|---|---|---|---|---|---|---|
| | | Percent CMC (on clay) | Clay+ CMC (percent) | Setting Agent | Percent NaOH | | |
| 16 | 0.53 | 7.5 | 40 | 10% NaCl | 0.75 | 7.0-7.5 | 3.0 |
| 17 | 0.53 | 7.5 | 40 | 10% NaH₂PO₄ | 0.75 | 5.0-5.5 | 4.5 |
| 18 | 0.55 | 7.5 | 45 | none | 0 | 5.5-6.0 | <1.0 |
| 19 | 0.55 | 7.5 | 40 | 11% MgCl₂ | 0.50 | 5.5-6.0 | 2.5 |
| 20 | 0.55 | 7.5 | 40 | 10% NaH₂PO₄ | 0.50 | 4.0-5.0 | 4.0 |
| 21 | 0.55 | 7.5 | 40 | 10% NaH₂PO₄ | 0.50 | 5.0-5.5 | 3.0 |
| 22 | 0.55 | 7.5 | 40 | 10% NaCl | 0.50 | 6.5-7.5 | 3.5 |
| 23 | 0.55 | 7.5 | 40 | 10% NaCl | 0.50 | 6.5-7.0 | 3.0 |
| 24 | 0.55 | 7.5 | 50 | 10% NaCl | 0.63 | 6.5-7.0 | 2.5 |
| 25 | 0.55 | 7.5 | 50 | 10% NaH₂PO₄ | 0.63 | 5.0-5.5 | 2.5 |
| 26 | 0.55 | 7.5 | 40 | 10% NH₄OH | 0.50 | 6.0 | 2.0 |
| 27 | 0.60 | 7.5 | 40 | 10% NaH₂PO₄ | 0.25 | 5.0-5.5 | 2.0 |
| 28 | 0.60 | 7.5 | 50 | 10% NaCl | 0.31 | 6.0-6.5 | 2.5 |
| 29 | 0.60 | 7.5 | 50 | 10% NaH₂PO₄ | 0.31 | 5.0-5.5 | 2.0 |
| 30 | 0.88 | 7.5 | 50 | none | 0 | 5.0-5.5 | <1.0 |
| 31 | 0.88 | 7.5 | 50 | 5% NaH₂PO₄ | 0 | 5.0-5.5 | 2.0 |
| 32 | 0.88 | 7.5 | 50 | 7.5% NaH₂PO₄ | 0 | 4.0-5.0 | 3.5 |
| 33 | 0.88 | 7.5 | 50 | 10% NaH₂PO₄ | 0 | 4.0-5.0 | 4.5 |
| 34 | 0.88 | 7.5 | 50 | 10% CaCl₂ | 0 | 5.0-5.5 | 3.5 |
| 35 | 0.88 | 7.5 | 45 | 11% MgCl₂ | 0 | 5.0-5.5 | 4.0 |
| 36 | 0.88 | 7.5 | 45 | 11% MgCl₂ | 0 | 5.0-5.5 | 3.5 |
| 37 | 0.88 | 7.5 | 45 | 11% MgCl₂ | 0.57 | 5.5-6.0 | 3.0 |
| 38 | 0.88 | 7.5 | 45 | 11% NaH₂PO₄ | 0.57 | 4.0-5.0 | 5.5 |
| 39 | 0.88 | 7.5 | 45 | 11% NaCl | 0 | 5.0-5.5 | 2.5 |
| 40 | 0.88 | 7.5 | 50 | 10% NaCl | 0 | 5.0-5.5 | 1.0 |
| 41 | 0.86 | 7.5 | 45 | none | 0 | 5.0-5.5 | <1.0 |
| 42 | 0.86 | 7.5 | 50 | 5% NaH₂PO₄ | 0 | 5.5-6.0 | 2.5 |
| 43 | 0.86 | 7.5 | 40 | 10% Na₂SO₄ | 0.50 | 6.5-7.5 | 3.0 |
| 44 | 0.86 | 7.5 | 40 | 10% NaCl | 0.50 | 6.5-7.5 | 4.0 |
| 45 | 0.86 | 7.5 | 40 | 10% NaCl | 0.50 | 6.5-7.5 | 3.5 |
| 46 | 0.78 | 7.5 | 40 | 10% NaCl | 0.50 | 7.0-7.5 | 4.0 |
| 47 | 0.86 | 7.5 | 40 | 10% MgCl₂ | 0.50 | 5.0-5.5 | 3.0 |
| 48 | 0.86 | 7.5 | 45 | 5.5% NaH₂PO₄ | 0.50 | 4.0-5.0 | 2.5 |
| 49 | 0.86 | 7.5 | 45 | 11% NaH₂PO₄ | 0.57 | 4.0-5.0 | 5.0 |
| 50 | 0.86 | 7.5 | 45 | 11% MgCl₂ | 0.57 | 5.0-5.5 | 5.0 |
| 51 | 0.86 | 7.5 | 45 | 11% MgCl₂ | 0.57 | 5.5-6.0 | 4.0 |
| 52 | 0.86 | 7.5 | 50 | 10% NaCl | 0.63 | 7.0-8.0 | 4.0 |
| 53 | 0.86 | 7.5 | 50 | 10% NaH₂PO₄ | 0.63 | 4.0-5.0 | 5.0 |

EXAMPLES 54–73

A coating color was prepared as in Examples 1–15, inclusive, using the sodium salt of a water-soluble sulfoethyl cellulose in place of hydroxyethyl cellulose. This color was applied to handsheets of Litho No. 5 raw stock at a coat weight of 11–13 lb. per ream (24 x 36/500) using a Martinson laboratory coater. The sheets were then dried on an electric hot plate at 200° F. colors, the number of sulfoethyl groups per anhydroglucose unit, i. e., the degree of substitution of the adhesive, the nature of the setting agent, the per cent of adhesive, clay and setting agent in the coating color and the per cent solids of the color, together with the surface pH and pick resistance of the resulting paper are all set forth in the following table:

*Table III.—Sodium sulfoethyl cellulose (SEC)*

| Example No. | D. S. | Coating Color | | | | Surface pH | Pick Resistance (Speed Ranger Units) |
|---|---|---|---|---|---|---|---|
| | | Percent SEC (on clay) | Clay+ SEC (percent) | Setting Agent | Percent NaOH | | |
| 54 | 0.36 | 7.5 | 50 | none | 0 | 5.0-5.5 | 1.0 |
| 55 | 0.36 | 7.5 | 50 | 5% NaH₂PO₄ | 0 | 4.0-5.0 | 2.0 |
| 56 | 0.36 | 7.5 | 50 | 5% MgCl₂ | 0 | 5.0-5.5 | 2.5 |
| 57 | 0.42 | 7.5 | 50 | none | 0 | 5.0-5.5 | <1.0 |
| 58 | 0.42 | 7.5 | 50 | 2.5% NaH₂PO₄ | 0 | 5.5-6.0 | 2.5 |
| 59 | 0.42 | 7.5 | 50 | 5% NaH₂PO₄ | 0 | 5.5-6.0 | 2.5 |
| 60 | 0.42 | 7.5 | 50 | 5% MgCl₂ | 0 | 4.0-5.0 | 2.0 |
| 61 | 0.42 | 7.5 | 50 | 7.5% MgCl₂ | 0 | 5.0-5.5 | 3.5 |
| 62 | 0.42 | 7.5 | 50 | 5% NaH₂PO₄ | 0 | 4.0-5.0 | 3.5 |
| 63 | 0.42 | 7.5 | 50 | 5% MgCl₂ | 0 | 4.0-5.0 | 2.5 |
| 64 | 0.42 | 7.5 | 45 | 10% NaH₂PO₄ | 0.28 | 5.5-6.0 | 3.0 |
| 65 | 0.42 | 7.5 | 45 | 10% CaCl₂ | 0.28 | 5.5-6.0 | 3.0 |
| 66 | 0.42 | 7.5 | 45 | 10% NaCl | 0.28 | 6.0-6.5 | 3.0 |
| 67 | 0.42 | 7.5 | 45 | 10% MgCl₂ | 0.28 | 5.5-6.0 | 3.0 |
| 68 | 0.45 | 7.5 | 50 | none | 0 | 5.5-6.0 | <1.0 |
| 69 | 0.45 | 7.5 | 45 | 10% CaCl₂ | 0.28 | 5.5-6.0 | 3.5 |
| 70 | 0.45 | 7.5 | 45 | 10% NaCl | 0.28 | 6.0-6.5 | 3.5 |
| 71 | 0.45 | 7.5 | 45 | 10% MgCl₂ | 0.28 | 5.5-6.0 | 3.0 |
| 72 | 0.63 | 7.5 | 50 | none | 0 | 4.0-5.0 | <1.0 |
| 73 | 0.63 | 7.5 | 50 | 5% NaH₂PO₄ | 0 | 4.0-5.0 | 2.0 |

EXAMPLES 74-79

A coating color was prepared as in Examples 1-15, inclusive, using the sodium salt of a water-soluble carboxymethyl hydroxyethyl cellulose in place of hydroxyethyl cellulose. This color was applied to handsheets of Litho No. 5 raw stock at a coat weight of 11-13 lb. per ream (24 x 36/500) using a Martinson laboratory coater. The sheets were then dried on an electric hot plate at 200° F.

A small amount of sodium hydroxide was added to the color in some of the examples to reduce the viscosity of the color. The per cent of sodium hydroxide in the colors, the number of carboxymethyl and hydroxyethyl groups per anhydroglucose unit, i. e., the degree of substitution of the adhesive, the nature of the setting agent, the per cent of adhesive, clay and setting agent in the coating color and the per cent solids of the color, together with the surface pH and pick resistance of the resulting paper are all set forth in the following table:

*Table IV.—Sodium carboxymethyl hydroxyethyl cellulose (CMHEC)*

| Example No. | D. S. | | Coating Color | | | | Surface pH | Pick Resistance (Speed Ranger Units) |
|---|---|---|---|---|---|---|---|---|
| | CM | HE | Percent CMHEC (on clay) | Clay+ CMHEC (percent) | Setting Agent | Percent NaOH | | |
| 74 | 0.43 | 0.41 | 7.5 | 50 | none | 0 | 5.0-5.5 | <1.0 |
| 75 | 0.43 | 0.41 | 7.5 | 45 | 5.5% NaH$_2$PO$_4$ | 0 | 4.0-5.0 | 2.0 |
| 76 | 0.43 | 0.41 | 7.5 | 45 | 5.5% MgCl$_2$ | 0 | 4.0-5.0 | 2.0 |
| 77 | 0.43 | 0.41 | 7.5 | 45 | 10% NaH$_2$PO$_4$ | 0.57 | 5.0-5.5 | 3.5 |
| 78 | 0.43 | 0.41 | 7.5 | 45 | 10% NaCl | 0.57 | 7.5-8.0 | 4.0 |
| 79 | 0.43 | 0.41 | 7.5 | 45 | 10% MgCl$_2$ | 0.57 | 5.5-6.0 | 5.0 |

The pick resistance referred to in the examples was obtained by means of a pick tester using the method described in "The Hercules Print Tester" by E. J. Barber and J. W. Davis in Tappi, vol. 34, page 433 (October 1951). The higher the speed ranger number the greater is the pick resistance or the bonding strength of the adhesive.

Referring again to the phenomenon of coagulation, the ability of the setting agent to coagulate the cellulose derivative is directly dependent upon the fundamental nature of its constituent ions and in particular upon their affinity for water molecules. It is my opinion that the coagulation results from the congregation of dipolar molecules of the polarizable solvent water around the ions of the setting agent. The cellulose derivative molecules are relatively nonpolar compared to the ions of the setting agent. Hence, a preferential orientation of the water molecules around the ions of the setting agent will occur. The net effect is a reduction in the amount of water available for the hydration of the cellulose derivative molecules, and the result is the coagulation of the cellulose derivative. In general, the affinity of an ion for water and hence its coagulation effect is larger the smaller its size and the greater the charge it carries.

The efficacy of an ion in coagulating the cellulose derivative is therefore attributed to its tendency to become hydrated. Among the setting agents which may be used to coagulate the water-soluble cellulose derivatives are the following: the water-soluble halides and nitrates of the alkali metals, the alkaline earth metals, magnesium and zinc; the mono- and di-alkali metal phosphates, etc. The following have also been used as setting agents: the sulfates of the alkali metals and of aluminum, magnesium and zinc, ammonium hydroxide, ammonium chloride, ammonium sulfate, etc. In general, the preferred gelation agents are mono- and di-sodium phosphate, magnesium chloride, calcium chloride, sodium chloride and ammonium hydroxide.

The cellulose derivative-containing coated papers prepared in accordance with this invention are characterized by having a minimum amount of binder in the coating as compared with prior art coated papers containing other binders. At the same time, the coating is flexible, resistant to chalking and resistant to rubbing and pick. The coating is nonalkaline which makes it especially desirable for lithographic, offset or gravure printing. The coating has no odor, has excellent keeping qualities and is uniform and smooth.

The advantages of the process of this invention as compared with the prior art process of Erickson are numerous and significant. Some of these advantages reside in the properties of the final product, i. e., the coated paper. Since these advantages have been discussed in some detail supra, there is no need for repetition at this point.

If desired, greaseproof papers may be prepared using substantially the same procedure described hereinabove, only using an aqueous solution of a gellable, water-soluble cellulose derivative and a setting agent therefor, the initial concentration of the setting agent being insufficient to induce coagulation. When such a solution is applied to the surface of the paper followed by drying, the concentration of setting agent increases to a point at which it induces coagulation of the cellulose derivative to form on the paper base a continuous film of cellulose derivative. Solutions having concentrations of gellable, water-soluble cellulose derivatives of from about 3% to about 12% are useful. The resulting treated paper is oilproof, greaseproof, flexible, has good aging characteristics, etc.

What I claim and desire to protect by Letters Patent is:

1. The process for preparing a coated paper of the type having a base of cellulosic fibers and a printing surface consisting essentially of a film of contiguous pigment particles interspersed in binder by means of which the pigment is retained on the base comprising applying to the surface of a web of cellulosic fibers a coating consisting essentially of a pigment dispersed in an aqueous solution of a gellable, water-soluble cellulose derivative as the binder and a setting agent therefor comprising a water-soluble compound which yields highly hydrated ions in an aqueous solution, the concentration of the setting agent in the coating prior to application thereof to the paper web being insufficient to induce coagulation of the cellulose derivative, and drying the paper whereupon the setting agent is concentrated to a point at which it induces coagulation of said cellulose derivative.

2. The process for preparing a coated paper of the type having a base of cellulosic fibers and a printing surface consisting essentially of a film of contiguous pigment particles interspersed in binder by means of which the pigment is retained on the base comprising applying to the surface of a web of cellulosic fibers a coating consisting essentially of a pigment dispersed in an aqueous solution of a gellable, water-soluble sulfoalkyl cellulose as the binder and a setting agent therefor comprising a water-soluble compound which yields highly hydrated ions in an aqueous solution, the concentration of the setting agent in the coating prior to application thereof to the paper web being insufficient to induce coagulation of the cellulose derivative, and drying the paper whereupon the setting agent is concentrated to a point at which it induces coagulation of the said sulfoalkyl cellulose.

3. The process for preparing a coated paper of the type having a base of cellulosic fibers and a printing surface consisting essentially of a film of contiguous pigment particles interspersed in binder by means of which the pigment is retained on the base comprising applying to the surface of a web of cellulosic fibers a coating consisting essentially of a pigment dispersed in an aqueous solution of a gellable, water-soluble carboxyalkyl cellulose as the binder and a setting agent therefor comprising a water-soluble compound which yields highly hydrated ions in an aqueous solution, the concentration of the setting agent in the coating prior to application thereof to the paper web being insufficient to induce coagulation of the cellulose derivative, and drying the paper whereupon the setting agent is concentrated to a point at which it induces coagulation of the said carboxyalkyl cellulose.

4. The process for preparing a coated paper of the type having a base of cellulosic fibers and a printing surface consisting essentially of a film of contiguous pigment particles interspersed in binder by means of which the pigment is retained on the base comprising applying to the surface of a web of cellulosic fibers a coating consisting essentially of a pigment dispersed in an aqueous solution of a gellable, water-soluble hydroxyalkyl cellulose as the binder and a setting agent therefor comprising a water-soluble compound which yields highly hydrated ions in an aqueous solution, the concentration of the setting agent in the coating prior to application thereof to the paper web being insufficient to induce coagulation of the cellulose derivative, and drying the paper whereupon the setting agent is concentrated to a point at which it induces coagulation of the said hydroxyalkyl cellulose.

5. The process for preparing a coated paper of the type having a base of cellulosic fibers and a printing surface consisting essentially of a film of contiguous pigment particles interspersed in binder by means of which the pigment is retained on the base comprising applying to the surface of a web of cellulosic fibers a coating consisting essentially of a pigment dispersed in an aqueous solution of a gellable, water-soluble carboxyalkyl hydroxyalkyl cellulose as the binder and a setting agent therefor comprising a water-soluble compound which yields highly hydrated ions in an aqueous solution, the concentration of the setting agent in the coating prior to application thereof to the paper web being insufficient to induce coagulation of the cellulose derivative, and drying the paper whereupon the setting agent is concentrated to a point at which it induces coagulation of the said carboxyalkyl hydroxyalkyl cellulose.

6. The process for preparing a coated paper of the type having a base of cellulosic fibers and a printing surface consisting essentially of a film of contiguous pigment particles interspersed in binder by means of which the pigment is retained on the base comprising applying to the surface of a web of cellulosic fibers a coating consisting essentially of a pigment dispersed in an aqueous solution of a gellable, water-soluble alkyl cellulose as the binder and a setting agent therefor comprising a water-soluble compound which yields highly hydrated ions in an aqueous solution, the concentration of the setting agent in the coating prior to application thereof to the paper web being insufficient to induce coagulation of the cellulose derivative, and drying the paper whereupon the setting agent is concentrated to a point at which it induces coagulation of the said alkyl cellulose.

7. The process for preparing a coated paper of the type having a base of cellulose fibers and a printing surface consisting essentially of a film of contiguous pigment particles interspersed in binder by means of which the pigment is retained on the base, comprising applying to the surface of a web of cellulosic fibers a coating consisting essentially of a pigment dispersed in an aqueous solution of a gellable, water-soluble cellulose derivative as the binder and a setting agent therefor comprising a water-soluble compound which yields highly hydrated ions in an aqueous solution and selected from the group consisting of mono- and di-alkali metal phosphates and the water-soluble halides and nitrates of the alkali metals, the alkaline earth metals, magnesium and zinc, the concentration of the setting agent in the coating prior to application thereof to the paper web being insufficient to induce coagulation of the cellulose derivative, and drying the paper whereupon the setting agent is concentrated to a point at which it induces coagulation of the said cellulose derivative.

8. The process for preparing a coated paper of the type having a base of cellulosic fibers and a printing surface consisting essentially of a film of contiguous pigment particles interspersed in binder by means of which the pigment is retained on the base, comprising applying to the surface of a web of cellulosic fibers a coating consisting essentially of a pigment dispersed in an aqueous solution of a gellable, water-soluble sulfoalkyl cellulose as the binder and a setting agent therefor comprising a water-soluble compound which yields highly hydrated ions in an aqueous solution and selected from the group consisting of the mono- and di-alkali metal phosphates and the water-soluble halides and nitrates of the alkali metals, the alkaline earth metals, magnesium and zinc, the concentration of the setting agent in the coating prior to application thereof to the paper web being insufficient to induce coagulation of the cellulose derivative, and drying the paper whereupon the setting agent is concentrated to a point at which it induces coagulation of said cellulose derivative.

9. The process for preparing a coated paper of the type having a base of cellulosic fibers and a printing surface consisting essentially of a film of contiguous pigment particles interspersed in binder by means of which the pigment is retained on the base, comprising applying to the surface of a web of cellulosic fibers a coating consisting essentially of a pigment dispersed in an aqueous solution of a gellable, water-soluble carboxyalkyl cellulose as the binder and a setting agent therefor comprising a water-soluble compound which yields highly hydrated ions in an aqueous solution and selected from the group consisting of the mono- and di-alkali metal phosphates and the water-soluble halides and nitrates of the alkali metals, the alkaline earth metals, magnesium and zinc, the concentration of the setting agent in the coating prior to application thereof to the paper web being insufficient to induce coagulation of the cellulose derivative, and drying the paper whereupon the setting agent is concentrated to a point at which it induces coagulation of said cellulose derivative.

10. The process for preparing a coated paper of the type having a base of cellulosic fibers and a printing surface consisting essentially of a film of contiguous pigment particles interspersed in binder by means of which the pigment is retained on the base, comprising applying to the surface of a web of cellulosic fibers a coating consisting essentially of a pigment dispersed in an aqueous solution of a gellable, water-soluble hydroxyalkyl cellulose as the binder and a setting agent therefor comprising a water-soluble compound which yields highly hydrated ions in an aqueous solution and selected from the group consisting of the mono- and di-alkali metal phosphates and the water-soluble halides and nitrates of the alkali metals, the alkaline earth metals, magnesium and zinc, the concentration of the setting agent in the coating prior to application thereof to the paper web being insufficient to induce coagulation of the cellulose derivative, and drying the paper whereupon the setting agent is concentrated to a point at which it induces coagulation of said cellulose derivative.

11. The process for preparing a coated paper of the type having a base of cellulosic fibers and a printing surface consisting essentially of a film of contiguous pigment particles interspersed in binder by means of which the pigment is retained on the base, comprising applying to the surface of a web of cellulosic fibers a coating consisting essentially of a pigment dispersed in an aqueous solution of a gellable, water-soluble carboxyalkyl hydroxyalkyl cellulose as the binder and a setting agent therefor comprising a water-soluble compound which yields highly hydrated ions in an aqueous solution and selected from the group consisting of the mono- and di-alkali metal phosphates and the water-soluble halides and nitrates of the alkali metals, the alkaline earth metals, magnesium and zinc, the concentration of the setting agent in the coating prior to application thereof to the paper web being insufficient to induce coagulation of the cellulose derivative, and drying the paper whereupon the setting agent is concentrated to a point at which it induces coagulation of said cellulose derivative.

12. The process for preparing a coated paper of the type having a base of cellulosic fibers and a printing surface consisting essentially of a film of contiguous pigment particles interspersed in binder by means of which the pigment is retained on the base, comprising applying to the surface of a web of cellulosic fibers a coating consisting essentially of a pigment dispersed in an aqueous solution of a gellable, water-soluble alkyl cellulose as the binder and a setting agent therefor comprising a water-soluble compound which yields highly hydrated ions in an aqueous solution and selected from the group consisting of the mono- and di-alkali metal phosphates and the water-soluble halides and nitrates of the alkali metals, the alkaline earth metals, magnesium and zinc, the concentration of the setting agent in the coating prior to application thereof to the paper web being insufficient to induce coagulation of the cellulose derivative, and drying the paper whereupon the setting agent is concentrated to a point at which it induces coagulation of said cellulose derivative.

13. The process for preparing a coated paper of the type having a base of cellulosic fibers and a printing surface consisting essentially of a film of contiguous pigment particles interspersed in binder by means of which the pigment is retained on the base, comprising applying to the surface of a web of cellulosic fibers a coating consisting essentially of a pigment dispersed in an aqueous solution of a gellable, water-soluble sulfoethyl cellulose as the binder and a setting agent therefor comprising a water-soluble compound which yields highly hydrated ions in an aqueous solution and selected from the group consisting of the mono- and di-alkali metal phosphates and the water-soluble halides and nitrates of the alkali metals, the alkaline earth metals, magnesium and zinc, the concentration of the setting agent in the coating prior to application thereof to the paper web being insufficient to induce coagulation of the cellulose derivative, and drying the paper whereupon the setting agent is concentrated to a point at which it induces coagulation of said cellulose derivative.

14. The process for preparing a coated paper of the type having a base of cellulosic fibers and a printing surface consisting essentially of a film of contiguous pigment particles interspersed in binder by means of which the pigment is retained on the base, comprising applying to the surface of a web of cellulosic fibers a coating consisting essentially of a pigment dispersed in an aqueous solution of a gellable, water-soluble carboxymethylcellulose as a binder and a setting agent therefor comprising a water-soluble compound which yields highly hydrated ions in an aqueous solution and selected from the group consisting of the mono- and di-alkali metal phosphates and the water-soluble halides and nitrates of the alkali metals, the alkaline earth metals, magnesium and zinc, the concentration of the setting agent in the coating prior to application thereof to the paper web being insufficient to induce coagulation of the cellulose derivative, and drying the paper whereupon the setting agent is concentrated to a point at which it induces coagulation of said cellulose derivative.

15. The process for preparing a coated paper of the type having a base of cellulosic fibers and a printing surface consisting essentially of a film of contiguous pigment particles interspersed in binder by means of which the pigment is retained on the base, comprising applying to the surface of a web of cellulosic fibers a coating consisting essentially of a pigment dispersed in an aqueous solution of a gellable, water-soluble hydroxyethyl cellulose as the binder and a setting agent therefor comprising a water-soluble compound which yields highly hydrated ions in an aqueous solution and selected from the group consisting of the mono- and di-alkali metal phosphates and the water-soluble halides and nitrates of the alkali metals, the alkaline earth metals, magnesium and zinc, the concentration of the setting agent in the coating prior to application thereof to the paper web being insufficient to induce coagulation of the cellulose derivative, and drying the paper whereupon the setting agent is concentrated to a point at which it induces coagulation of said cellulose derivative.

16. The process for preparing a coated paper of the type having a base of cellulosic fibers and a printing surface consisting essentially of a film of contiguous pigment particles interspersed in binder by means of which the pigment is retained on the base, comprising applying to the surface of a web of cellulosic fibers a coating consisting essentially of a pigment dispersed in an aqueous solution of a gellable, water-soluble carboxymethyl hydroxyethyl cellulose as the binder and a setting agent therefor comprising a water-soluble compound which yields highly hydrated ions in an aqueous solution and selected from the group consisting of the mono- and di-alkali metal phosphates and the water-soluble halides and nitrates of the alkali metals, the alkaline earth metals, magnesium and zinc, the concentration of the setting agent in the coating prior to application thereof to the paper web being insufficient to induce coagulation of the cellulose derivative, and drying the paper whereupon the setting agent is concentrated to a point at which it induces coagulation of said cellulose derivative.

17. The process for preparing a coated paper of the type having a base of cellulosic fibers and a printing surface consisting essentially of a film of contiguous pigment particles interspersed in binder by means of which the pigment is retained on the base, comprising applying to the surface of a web of cellulosic fibers a coating consisting essentially of a pigment dispersed in an aqueous solution of a gellable, water-soluble ethyl cellulose as the binder and a setting agent therefor comprising a water-soluble compound which yields highly hydrated ions in an aqueous solution and selected from the group consisting of the mono- and di-alkali metal phosphates and the water-soluble halides and nitrates of the alkali metals, the alkaline earth metals, magnesium and zinc, the concentration of the setting agent in the coating prior to application thereof to the paper web being insufficient to induce coagulation of the cellulose derivative, and drying the paper whereupon the setting agent is concentrated to a point at which it induces coagulation of said cellulose derivative.

18. The process for preparing a coated paper of the type having a base of cellulosic fibers and a printing surface consisting essentially of a film of contiguous pigment particles interspersed in binder by means of which the pigment is retained on the base, comprising applying to the surface of a web of cellulosic fibers a coating consisting essentially of a pigment dispersed in an aqueous solution of a gellable, water-soluble cellulose derivative as the binder and a setting agent therefor, said cellulose derivative being selected from the group consisting of sulfoalkyl cellulose, carboxyalkyl cellulose, hydroxyalkyl cellulose, carboxyalkyl hydroxyalkyl cellulose and alkyl cellulose, and said setting agent comprising a water-soluble compound which yields highly hydrated ions in an aqueous solution and selected from the group consisting of the mono- and di-alkali metal phosphates and the water-soluble halides and nitrates of the alkali metals, the alkaline earth metals, magnesium and zinc, the concentration of the setting agent in the coating prior to application thereof to the paper web being insufficient to induce coagulation of the cellulose derivative, and drying the paper whereupon the setting agent is concentrated to a point at which it induces coagulation of said cellulose derivative.

References Cited in the file of this patent

UNITED STATES PATENTS

| | | |
|---|---|---|
| 2,402,542 | Foote | June 25, 1946 |
| 2,502,783 | Erickson | Apr. 4, 1950 |
| 2,505,489 | Green | Apr. 25, 1950 |
| 2,655,101 | Newman | Oct. 13, 1953 |

FOREIGN PATENTS

| | | |
|---|---|---|
| 480,679 | Great Britain | of 1938 |